__United States Patent Office__

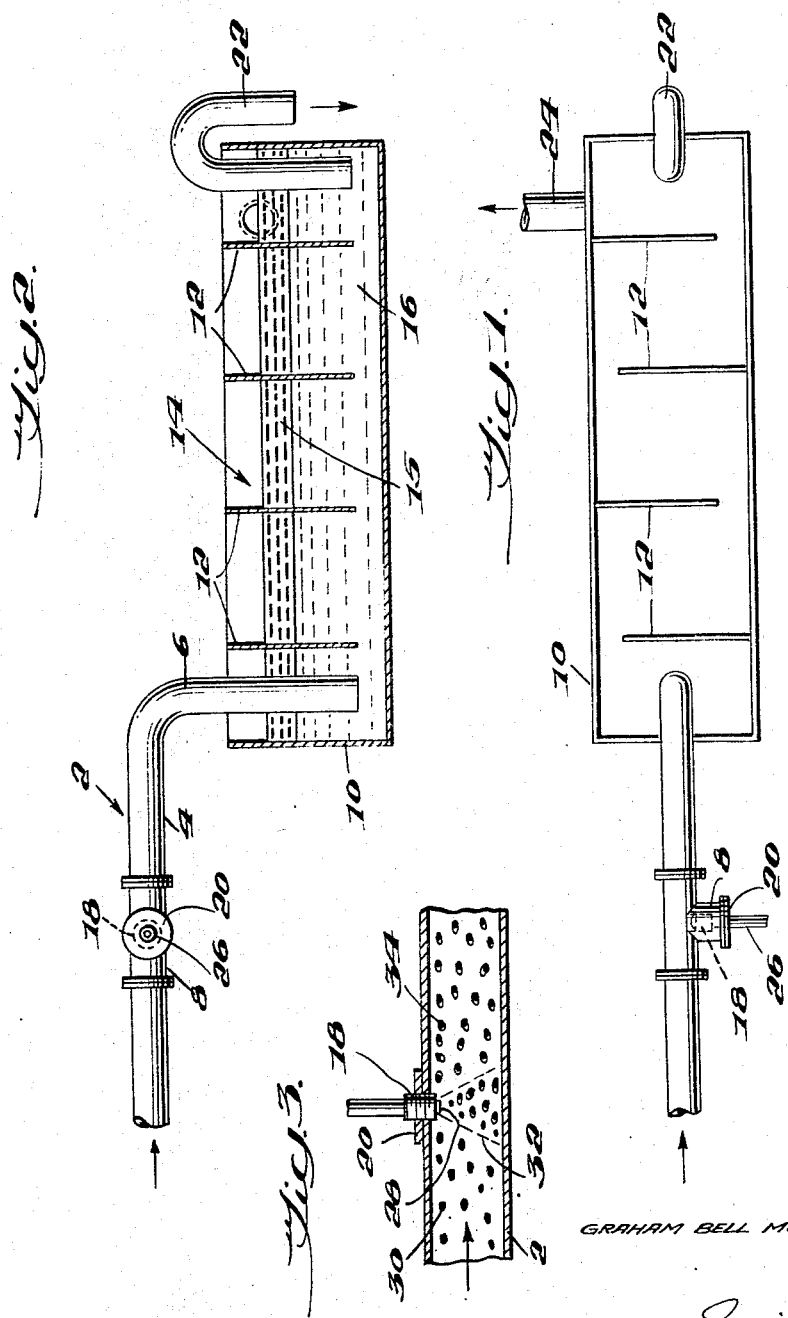

3,276,995
Patented Oct. 4, 1966

3,276,995
PROCESS FOR THE REMOVAL OF DISPERSED CARBON PARTICLES FROM AN AQUEOUS MEDIA
Graham Bell McDonald, Jr., Louisville, Ky., assignor to E. I. du Pont de Nemours and Company, Wilmington, Del., a corporation of Delaware
Filed May 29, 1963, Ser. No. 284,124
2 Claims. (Cl. 210—21)

This invention relates to a new process for clarifying an aqueous medium, and particularly to the removal of dispersed carbon particles from said medium.

In the pyrolysis of hydrocarbons to acetylene, ethylene, butadiene, and other unsaturated products by the process of partial combustion of starting material, mixing with hot gases, passage through an externally heated furnace or an electric arc, and similar processes, amorphous carbon is formed as a by-product. Part of the carbon usually deposits on the walls of the pyrolysis apparatus, another part becomes suspended in water used for quenching the hot gases, while the rest, usually relatively small in amount and finely divided, remains suspended in the product gas. Since even a small amount of carbon in the product gas causes trouble in the subsequent purification steps by accumulating in solvents used for selectively dissolving the specific products from the gas, the carbon suspended in the gas is usually first removed by scrubbing with water. When the carbon deposited on the walls of the pyrolysis apparatus is removed therefrom by scraping, it in general enters the product gas stream or the water stream used for quenching. Part of the carbon may in some cases be separated from the water by settling but in most cases part or all remains dispersed therein. Thus, there may be formed in these various processes for making unsaturated hydrocarbons by pyrolysis, one or more dispersions of finely divided carbon in water. These cannot be ditched, since they contain important quantities of the products in solution and since also they tend to pollute rivers and lakes into which they are discharged. If they are recirculated through the quenching and scrubbing equipment, the carbon accumulates and tends to plug the equipment and piping. It is therefore necessary to remove the finely divided carbon as well as the coarser carbon particles before the water containing dissolved hydrocarbon products is recirculated.

Filtration and centrifugation are both costly for the removal of the fine particles involved which are usually less than 30 microns and may be as small as 0.02 micron in size. It has also been proposed to separate carbon dispersed in water by contacting the carbon particles with oil droplets produced by high speed agitation of the dispersion and oil added thereto optionally in the presence of surface-active agents, and then separating the carbon-containing oil from the water by permitting the layers to separate under relatively quiescent conditions. A simple, more economical method of removing carbon with oil, which does not require the installation and maintenance of high speed mixing equipment, is highly desirable.

It is an object of the present invention to provide a process for clarifying an aqueous medium of dispersed carbon particles particularly of the amorphous type.

A further object of the present invention is to provide a process for separating carbon particles, especially in the finely divided sizes of less than 30 microns in diameter, from dissolved hydrocarbon containing aqueous solutions derived from pyrolysis operations.

A still further object of the present invention is to obtain the foregoing objects without the need of auxiliary equipment to agitate the aqueous solution. Other objects will appear hereinafter.

It has been found that finely divided carbon may be separated from aqueous dispersions thereof by the process which comprises maintaining a flowing stream of the solution having the fine carbon particles dispersed therein, spraying an immiscible liquid having an affinity for the carbon particles into the flowing stream so that the carbon particles are contacted by fine droplets of the immiscible liquid moving transverse the flowing stream, the spray originating from a point or points substantially contiguous with the flowing stream, as would be obtained by a spray head having its outlet in contact with the stream, whereby the droplets of immiscible liquid agglomerate with the carbon particles and then with each other, no agitation of the flowing stream by auxiliary equipment being necessary, thereafter allowing the agglomeration to proceed to separate into a carbon-free water layer and a liquid layer containing the finely divided carbon and then separating the layers one from the other. Various liquid hydrocarbons serving as the immiscible liquid are effective to obtain the above result, the preferred being petroleum oils.

The present invention and its advantages will be better understood by reference to the following description and the accompanying drawings, in which:

FIG. 1 is a top schematic view of representative equipment for carrying out the process of the present invention;

FIG. 2 is a cross-sectional side view of the equipment depicted in FIG. 1; and

FIG. 3 is an enlarged view of a portion of the equipment shown in FIG. 1 and showing an alternative mounting for a spray head.

In FIGS. 1 and 2 are shown an aqueous solution supply pipe 2 having a horizontal section 4 bearing a flanged T 8 and a section 6 extending downwardly into tank 10 as shown. Tank 10 is an elongated trough with transverse baffles 12 extending alternately from the long sides thereof, terminating short of the bottom of the trough, and extending above the level of the liquid 14 contained therein. The liquid 14 is composed of an oil upper layer 15 and an aqueous lower layer 16. A spray head 18 for injecting fine droplets of oil into the aqueous solution flowing through the bore of pipe 2 is positioned within T 8 in such a manner that its tip or oil outlet extends slightly into the liquid path formed by the pipe 2 and main passage of T 8. The spray head 18 is mounted in flange 20. Tank 10 is provided with line 22 dipping into the aqueous solution layer and line 24 having its inlet positioned in the oil layer, both lines being for the continuous removal of the liquid of their respective layers.

In FIG. 3 is shown in an enlarged cut-away view spray head 18 mounted with its outlet 28 projecting through an aperture in the wall of pipe 2 and contiguous with the aqueous medium flowing through the bore of the pipe. An oil spray of fine droplets issuing from outlet 28 in the form of hollow cone 32 transversing the cross-section of the pipe is also shown. Depicted schematically and in oversize for purposes of clarity are dispersed carbon particles 30 upstream of the spray and agglomerants 34 of carbon particles with oil droplets downstream of the spray, the agglomerants 34 resulting from contact of the carbon particles with the oil spray. The spray head 18 is exteriorally threaded to engage corresponding threads in flange 20 which in this case is mounted directly onto the wall of pipe 2 rather than on the branch of a T, such as T 8 shown in FIG. 2.

In operation, the aqueous medium obtained from the pyrolysis equipment or the gaseous product scrubbing water and containing dissolved product and dispersed carbon particles (finely divided only if obtained from the latter or if coarse carbon has settled out of the former) is flowed continuously through pipe 2 (and T 8). Fine droplets of oil supplied by line 26 are sprayed from spray head 18 into the flowing aqueous medium in a manner to be spread across the entire path of the stream, whereby the carbon particles in the aqueous stream are contacted by and agglomerated with the fine oil droplets. The aqueous medium now containing dispersed oil-carbon agglomerants proceeds along pipe 2 to be discharged into the water layer 16 of tank 10. Owing to the relative quiescence of the water layer 16, the oil droplets adhering to the carbon particles rapidly rise to the top thereof to join the oil layer 15, both layers being continuously withdrawn from tank 10 by their respective lines 22 and 24 at sufficient rates to prevent the level of the water layer from reaching the inlet of line 24 and to prevent the oil layer from overflowing the tank. Preferably, the oil layer is maintained at a thickness of 6–12 inches.

The fine droplets of liquid hydrocarbon sprayed under pressure into the flowing stream should be on the order of 200 microns in diameter or smaller, particularly when the carbon particles are smaller than 30 microns and the weight percentage thereof with respect to the water present is about only 0.2% as is quite common. Spray patterns in the form of hollow cones are preferred. Preferably, the liquid hydrocarbon is given a velocity great enough to carry the particles to all parts of the stream of the water dispersion of the carbon. A suitable spray for obtaining these results is the "Spraco" hollow cone mist spray nozzle, obtainable from the Spray Engineering Company, of Burlington, Massachusetts.

It is usually most convenient to inject the oil into the water solution while the latter is flowing through a pipe, but other means providing a path for the stream are satisfactory, provided that the spray nozzles or spray are arranged so that dense distribution of the fine droplets of oil across the cross section of the stream is present and the agglomerated oil phase is rapidly allowed to separate and be removed. Rather than a single spray nozzle being used, a plurality of spray nozzles may be mounted in annular or spiral fashion around the bore of the pipe or path of the flowing suspension, or where a pipe of large enough cross-section is used, a spray nozzle may be mounted within the flowing stream with the spray being directed at the wall defining the bore of the pipe.

The ratio of oil to carbon may be varied widely. It is only required that the mixture of oil and carbon in the resultant oil layer be fluid enough to be readily removed. Ratios between 1.8 and 7.0 parts by weight of oil per part by weight of carbon are preferred but lower and higher ratios are operable. The only objection to the higher ratios is that they are uneconomical, the excess of oil serving no useful purpose.

The hydrocarbon oil is preferably non-volatile or slightly volatile but the more volatile hydrocarbons of both the aromatic and aliphatic series and higher boiling materials such as light lubricating oils may also be used. Expressed chemically, the oil is a normally liquid saturated hydrocarbon of the aliphatic or cycloaliphatic series, containing 7 to 20 carbon atoms. The oils do not have to be highly refined. Commercial fuel oils are preferred because of both their suitable properties and low cost and availability and also because the resulting mixture of carbon and oil is still useful as fuel.

The present invention may be used to collect either the rather coarse particles in the quenching water or be applied to the more difficult task of removing the very fine carbon particles present in the water used to scrub the gas from which the coarser particles have already been removed in the quenching and scrubbing operation. The process of separating the carbon may be carried out between the freezing point and boiling point of the water, pressure being applied when needed to prevent the escape of the dissolved gaseous hydrocarbon products. Ordinarily, it is most convenient to have the water phase at the temperature at which it leaves the quenching and scrubbing operations. The oil may be raised to a similar temperature.

The following is an example of the process of the present invention performed in the equipment previously described; the invention is by no means limited to the particular process conditions or apparatus specified. A stream of water at 45° C., containing 0.2% by weight of dispersed amorphous carbon particles from 0.02 to 30 microns in diameter flows through the 2 inch horizontal pipe at a rate of 30 gal. per minute. A fuel oil of specific gravity 0.8529 with approximate composition $C_{14.6}H_{26.9}$ is supplied to the nozzle at about 200 lbs./sq. in. pressure, and passes directly into the water in a hollow cone pattern through a 0.040 inch orifice at the rate of 3.5 lbs. per minute (7 lbs./lb. of suspended carbon) as fine droplets less than 200 microns in diameter. The velocity of these droplets is such that they pass through the whole cross-section of the water flowing through pipe 2 and thus come in effective contact with all the carbon particles. The stream is discharged into the settling tank 10. The oil particles with the absorbed carbon rapidly coalesce, forming a somewhat viscous suspension of carbon in oil as an upper phase with water as the lower phase. Almost all of the acetylene or other hydrocarbon product remains dissolved in the water phase which is recirculated to the quenching and scrubbing operations. The fuel oil containing the suspended carbon is entirely suitable for burning.

As many widely different embodiments of this invention may be made without departing from the spirit and scope thereof, it is to be understood that this invention is not limited to the specific embodiments thereof except as defined in the appended claims.

What is claimed is:

1. A process for removing finely divided carbon particles from an aqueous dispersion thereof, comprising maintaining said dispersion as a flowing stream, injecting fine droplets of oil into said stream across substantially the entire cross-section thereof, said fine droplets issuing from an origin in contact with said flowing stream, to contact said carbon particles with said fine droplets to obtain agglomeration therebetween, discharging said stream into a relatively large and slow moving aqueous medium thereby allowing the fine droplets of oil agglomerated with said carbon particles to coalesce into a layer of oil, and separating said layer of oil and aqueous medium one from the other.

2. A process for removing finely divided carbon particles from an aqueous dispersion thereof, comprising maintaining said dispersion as a flowing stream, injecting fine droplets of oil into said stream across substantially the entire cross-section thereof, said fine droplets issuing from an origin in contact with said flowing stream, to contact said carbon particles with said fine droplets to obtain agglomeration therebetween, the ratio of said oil to said carbon having from 1.8 to 7.0 parts by weight of said oil per part by weight of said carbon, discharging said stream into a relatively large and slow moving aqueous medium thereby allowing the fine droplets of oil agglomerated with said carbon particles to coalesce into a layer of oil, and separating said layer of oil and aqueous medium one from the other.

References Cited by the Examiner

UNITED STATES PATENTS

| | | | |
|---|---|---|---|
| 2,799,645 | 7/1957 | Musgrove | 210—42 |
| 3,148,140 | 9/1964 | Kaiser et al. | 210—21 |

MORRIS O. WOLK, *Primary Examiner.*

E. G. WHITBY, *Assistant Examiner.*